May 3, 1966 W. H. JAMIESON 3,249,669
PROCESS FOR MAKING COMPOSITE POLYESTER FILAMENTS
Filed March 16, 1964 4 Sheets-Sheet 1
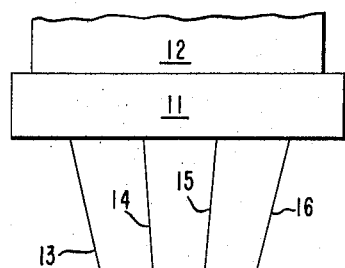
FIG. 1
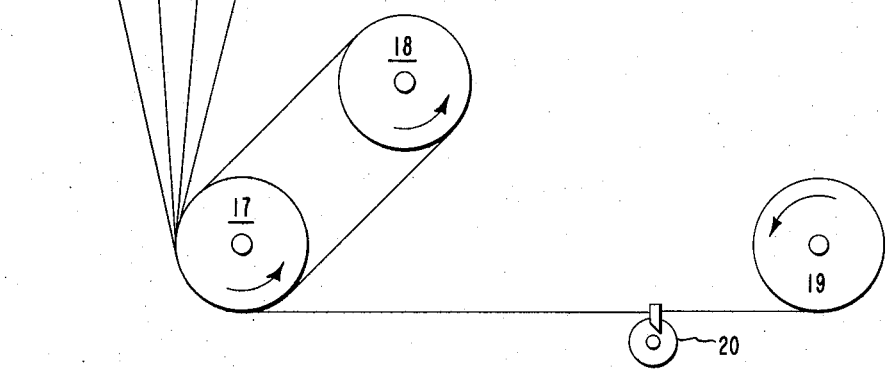
FIG. 2
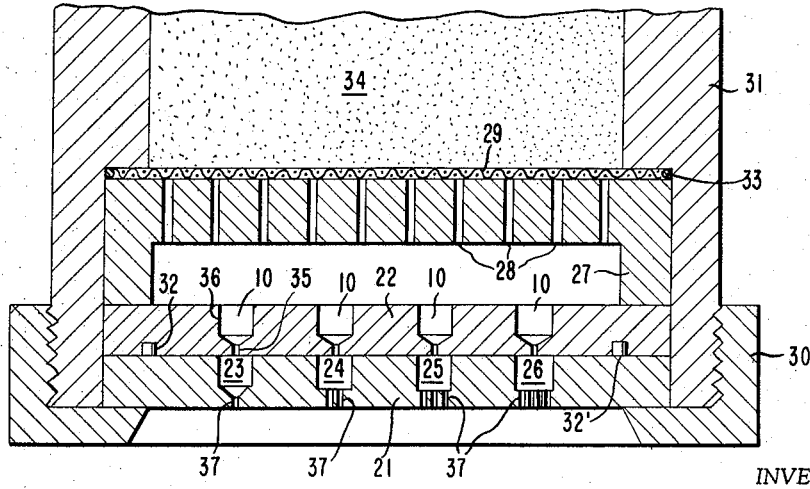
INVENTOR
WILLIAM H. JAMIESON
BY
ATTORNEY FIG. 3a  FIG. 3b  FIG. 4a  FIG. 4b
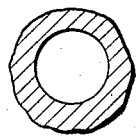  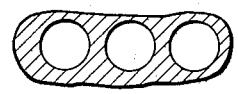 
FIG. 5a  FIG. 5b  FIG. 6a  FIG. 6b
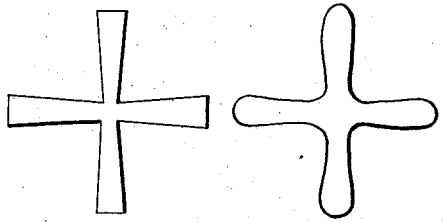 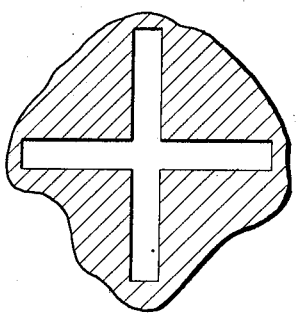 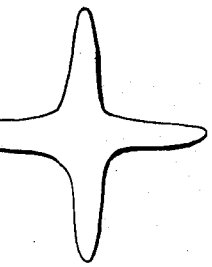
FIG. 7a
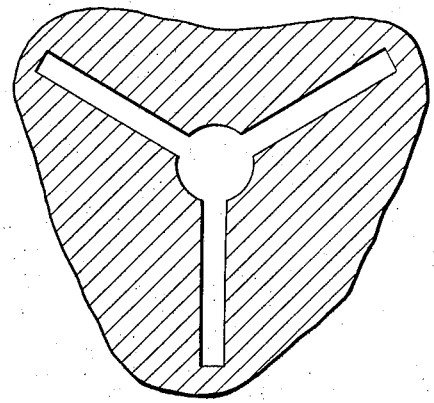
FIG. 7b
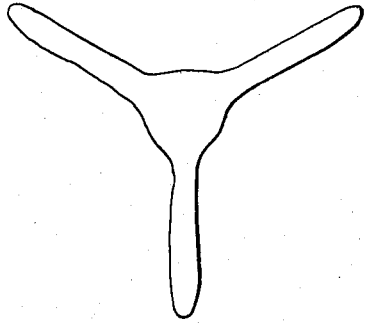
FIG. 8a
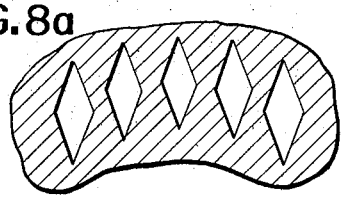
FIG. 8b
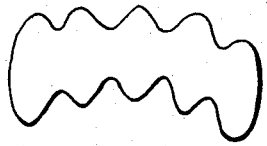
INVENTOR
WILLIAM H. JAMIESON
BY
ATTORNEY

INVENTOR
WILLIAM H. JAMIESON

BY

ATTORNEY

INVENTOR
WILLIAM H. JAMIESON

BY

ATTORNEY

United States Patent Office 3,249,669
Patented May 3, 1966

3,249,669
PROCESS FOR MAKING COMPOSITE
POLYESTER FILAMENTS
William H. Jamieson, Newark, Del., assignor to E. I. du
Pont de Nemours and Company, Wilmington, Del., a
corporation of Delaware
Filed Mar. 16, 1964, Ser. No. 352,047
The portion of the term of the patent subsequent to
Apr. 18, 1978, has been disclaimed
5 Claims. (Cl. 264—177)

This application is a continuation-in-part of Serial Number 841,988, filed September 24, 1959, now Patent No. 3,156,085.

This invention relates to composite polyester yarns and the process for manufacturing said yarns. More particularly, this invention relates to composite polyester yarns which have a highly uniform appearance in the form of dyed fabrics.

Synthetic linear condensation polyesters, and particularly the linear terephthalate polyesters, have attracted high commercial interest for many uses owing to their high tenacity, flexibility, crease resistance, low moisture absorption, and other valuable properties. Among such polyesters are polyethylene terephthalate and poly(p-hexahydroxylylene terephthalate). However, one difficulty has been associated with the polyesters in that the affinity of the polyester fibers for dyes changes markedly with variations in processing conditions. The sensitivity of the polyesters to varying conditions is such that even quite minor fluctuations in the process are sufficient to cause noticeable changes in the dye affinity of the fibers. In commercial production, it is frequently observed that non-uniformities occur sporadically within a single filament, or that one filament is continuously non-uniform with respect to the average. These non-uniformities are observed as light or dark streaks in dyed fabrics and are regarded as highly objectionable.

Attempts have been made to solve the problem of non-uniformities in various ways. In general, attention has been focused on greater control of process variables such as polymer composition and molecular weight, temperature during the spinning and orientation steps, and tension applied during the various steps. However, due to the inherent difficulty of the problem, these attempts have not met with complete success.

It is, therefore, an object of this invention to provide polyester yarns which have a uniform appearance in the form of dyed fabrics. Another object is to provide such yarns by a process which is less sensitive to small fluctuations in process conditions than processes used heretofore. Other objects of this invention will appear hereinafter.

Surprisingly, it has now been found that when filaments of different cross section are spun together and forwarded as a single filament bundle, the yarn so formed has a uniform appearance in the form of a dyed fabrics. When the dyed yarn is observed under magnification, it is seen that the individual filaments have varied shades of color. However, as seen by the unaided eye, the over-all appearance of the fabric is quite uniform. The yarn of which the fabric is made is also slightly more bulky than conventional continuous filament yarn of homogeneous cross section, and this also contributes to the desirable appearance of the fabric.

In carrying out the process of the invention, a molten linear condensation polyester is extruded through a plurality of spinneret orifices of different shapes. The polymer streams are then quenched and oriented, and the filaments so formed are forwarded as a single filament bundle to a collecting device. The filaments assume essentially the shape of the orifice through which they are extruded. The forwarding speeds may be selected within a wide range, forwarding speeds in excess of about 300 yards per minute usually being employed. It is generally desired that the extruded filaments be oriented to cause them to become tenacious. This may be done simply by winding the extruded filaments at very high rates of speed, e.g., at about 3000 to 5200 yards per minute, as described by Hebeler in U.S. Patent 2,604,689. Alternatively, the extruded filaments may be gathered into a bundle and the yarn so formed may then be oriented by drawing it from two to about five times its original length at temperatures in the range of about 20° to 120° C. in one or more separate steps as disclosed by Whinfield and Dickson in U.S. Patent 2,465,319. Because the orientation of the yarn in the spinning step increases with spinning speed, the draw ratio required to reach a given level of orientation in the yarn decreases as the spinning speed increases.

In referring to the filaments as having different cross sections, it is meant that the cross sections should differ markedly. A convenient numerical parameter relating to the shape of the cross sections is the "shape factor," which is defined by the equation $$\text{Shape Factor} = P^2/A$$

where P is the perimeter of the cross section and A is its area, measured in the same units of length. Thus, a circle has a shape factor of 4 pi or 12.6; a square has a shape factor of 16; and a rectangle having long sides four times the length of its short sides has a shape factor of 25. The shape factors of the spinneret orifices are readily calculated from the spinneret specifications or by measurements made from a photomicrograph of the spinneret face; while the shape factors of the filament cross sections can be calculated from measurements made from a photomicrograph of a cross section of the yarn.

In accordance with the process of the present invention, it has been found that least one species of filaments in the filament bundle should be spun from orifices which have a shape factor of at least about 18. Thus, filaments spun from round orifices may be combined with filaments spun from ribbon-shaped (elongated rectangular), Y-shaped, or cruciform orifices having shape factors of at least about 18.

In the event that all of the filaments in the bundle are spun from orifices having the same number of sides, i.e., having the same general configuration as viewed on the surface of the spinneret plate, the shape factors of at least two of the different types of orifices in the spinneret should differ by a factor of at least 1.4. For instance, two varieties of cruciform orifices having shape factors differing by a factor of at least 1.4 may be included in the same spinneret plate in order to spin two varieties of cruciform filaments in the same filament bundle; or two varieties of ribbon-shaped orifices having shape factors differing by a factor of at least 1.4 may be used in the same spinneret plate to produce a yarn comprised of two species of ribbon cross section filaments.

All of the orifices from which the filaments are spun may have essentially the same shape factor, provided that the shape factor is at least about 18 and the orifices differ markedly in shape. Preferably, in the latter case, at least two of the differently shaped orifices in the spinneret should have different numbers of sides. The term "sides" is intended to include curved sides in the shape of the orifice as well as straight sides. Orifices of relatively complex shape are best regarded as being formed by the fewest practicable number of straight or curved lines, without including minor indentations or slight roundings of corners in counting the number of sides. For example, Y-shaped orifices may be used with cruciform orifices even though the orifices have the same shape factor. Similarly, cruciform and ribbon-shaped orifices having the same shape factor may be used together; or cruciform orifices may be used with C-shaped orifices characterized by the same shape factor to spin yarns comprised of filaments of the corresponding cross sections.

In accordance with the present invention, not more than about 75% of the orifices in a spinneret should have the same shape and shape factor.

In a preferred embodiment of the invention, three or more different orifice shapes are used. In one particularly desirable embodiment, not more than about 25% of each of several different orifice shapes is utilized. Although each filament cross section need not be different, a variety of cross sections in the filament bundle is conducive to better uniformity. Since the cross sections of the filaments are governed by the shape of the orifices in the spinneret, a variety of filament cross sections can be obtained in each bundle simply by varying the shapes of the orifices in the spinneret.

The essence of the invention comprises extruding the same molten polymer simultaneously through orifices of different shape to produce filaments, quenching the filaments to solidify them in essentially the same cross section as the shape of the orifices from which they are extruded, and forming a yarn by gathering the solidified filaments together as a single bundle prior to winding. Usually, a single spinneret plate is made containing the orifices of different shape, although when it is more convenient the orifices may be in different spinneret plates so long as the filaments are spun of the same polymer substantially simultaneously and brought together prior to winding to form a single yarn.

The filaments may be solidified by employing any conventional quenching conditions. Suitable quenching media are air, nitrogen, water, and other inert fluids at a temperature at least about 100° C., below the melting point of the polyester being spun. Ordinary quenching with a current of air at room temperature through screens of the fine mesh at the rate of about 0.2 to 10 cubic feet per minute per square inch of screen is quite satisfactory.

At the instant of extrusion the polymer of which the filament is formed fills the orifice and has the same shape factor as the orifice. Just below the orifice there is usually some expansion or "bulging" of the diameter of the filament as the pressure of the spinneret pack is released, and simultaneously a tendency for the cross section of the filament to become more round if it is not already circular. In practice, under normal quenching conditions the shape factor of the extruded filaments is thus considerably lower than the shape factor of the orifices from which they are spun. At least about 25% of the orifices should have a shape factor of at least 18; and if all of the orifices have the same number of sides, there should be a ratio of at least about 1.4 between the shape factors of the orifices having the highest and lowest shape factors. In other words, if the orifices are ranked by the magnitude of their shape factor, the shape factors of the highest quarter should be at least about 1.4 times greater than those of the lowest quarter when the shapes of the orifices are substantially the same.

The upper limit of orifice shape factors is not especially critical. Orifices having shape factors of 100 or higher, i.e. having shape factors about eight or more times that of a circular orifice, may be used. The degree of correspondence of the cross section of the filament to the shape of the orifice can also be promoted, if desired, by increasing the velocity of the quenching air.

It might be thought that the problem of nonuniform yarns would be aggravated by proceeding in a direction which would appear to magnify the non-uniformities of the filaments comprising the yarns. The process of the present invention surprisingly produces the opposite result and leads to yarns comprised of subtly varied filaments having a pleasing and attractive appearance in the form of dyed fabrics. The process of the invention also solves the non-uniformity problem in a most advantageous manner with regulation of the filament cross section as the sole variable, employing a single source of polymer spun and drawn at desired speeds and temperatures. It is necessary to modify the conventional process only to the extent of simple substitution of the usual spinneret with a spinneret having orifices of different shapes, eliminating any necessity of producing yarns having slightly different dyeability properties and then twisting, plying, or intertwining the separate yarns in some manner.

Through routine experimentation, the hole size for each orifice shape appropriate for substantially equivalent polymer flow rates through the orifices may be determined. However, a simpler method of achieving this result is the use of a metering plate containing capillary holes aligned with the spinneret orifices. The diameter of the capillary holes in the metering plate are made sufficiently small with respect to the spinneret orifices that most of the pressure drop across the metering plate and the spinneret occurs within the metering plate. The denier of the filaments is thereby controlled primarily by the metering plate; and when substantially uniform deniers are desired, the diameters of the orifices in the metering plate are made uniform. When filaments of different denier are desired, it is also generally more convenient to use a metering plate with circular orifices having diameters varied in a known manner to regulate the polymer flow than to find the necessary sizes of the orifices of odd shape in the spinneret plate to achieve the exact rates of polymer flow desired. It has been observed that making the filaments of different denier tends to increase the bulkiness of the yarns when they are subsequently heated.

The bulkiness of the yarns may also be increased in other ways. For example, two bundles of the extruded filaments may be gathered together separately, subjected to the same overall attenuation between the spinneret and the wind-up but under slightly different processing conditions, and the two bundles of filaments brought together prior to winding as a single yarn. The two bundles of filaments may be drawn at the same draw ratio but with the draw rolls maintained at different temperatures, for instance. By this method, a yarn can be made containing filaments which shrink by different amounts when heated again, enhancing the bulkiness of the yarn. The final heating step is usually deferred until the yarn is in fabric form. The amount of differential shrinkage in the yarn, and correspondingly the degree of bulkiness produced in the final heating step, can be adjusted by varying the difference in processing conditions to which the filament bundles are subjected prior to being brought together as a single yarn. In preparing such a yarn of enhanced bulkiness, it is preferred that the filament bundles are gathered separately in such a way that each filament bundle is a mixed cross section filament bundle as defined above, since this leads to the optimum uniformity and desirable appearance in dyed fabrics made from the yarn.

The invention will be further illustrated by reference to the accompanying drawings, in which:

FIGURE 1 is a schematic representation of suitable apparatus for spinning polyester filaments;

FIGURE 2 is a diagrammatic cross-sectional view of the portion of the spinning head of FIGURE 1;

Figure 9A:
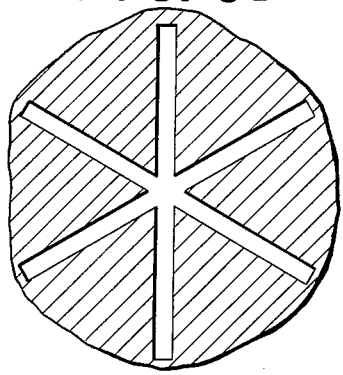

FIGURES 3a through 17a are bottom views of spinneret orifices of various shapes; and FIGURES 3b through 17b are cross sections of filaments spun from the corresponding orifices of FIGURES 3a through 17a.

Referring now to FIGURE 1, the lower portion of a spinning head is represented by reference numeral 11. Molten polymer metered to cavity 12 is extruded through orifices not illustrated forming filaments 13, 14, 15, and 16. The filaments are drawn away from the orifice by means of a pair of slightly axially skewed forwarding rolls 17 and 18, and are delivered as a single yarn bundle to windup package 19. The yarn is traversed onto package 19 by means of a reciprocating traverse guide 20.

Referring to FIGURE 2, the spinning head includes a spinneret plate 21 positioned in contact with a metering plate 22. Spinneret orifices 23, 24, 25, and 26 are aligned with metering orifices 10. A cupped distributor plate 27, containing a plurality of holes 28, is located upstream from metering plate 22. The upstream face of distribution plate 27 is in contact with screen 29. Retaining cap 30, which is threaded onto spinneret housing 31, secures the plates and screen in position. Pins 32 and 32' on spinneret plate 21 are recessed into holes in the bottom of metering plate 22 and serve to align the orifices in the two plates. Gasket 33 provides a seal between screen 29, cupped distribution plate 27, and housing 31. The cavity 34 in housing 31 is filled with a filtering medium such as sand.

Both the metering orifices 10 and spinning orifices 23, 24, 25, and 26 have compound shapes. Orifices 10 consist of a capillary 35 and counterbore 36. The spinneret orifices consist of jets 37 and counterbore 38. The counterbores and capillaries are circular in cross section; however, the jets may have various shapes as illustrated in FIGURES 3a through 17a. As used herein, the "shape" of the orifices refers to the shape of the jet at the extrusion face, or bottom face, of the spinneret, i.e., the cross section of the jet perpendicular to the direction of polymer flow. The jets of spinneret orifices 23, 24, 25, and 26 are shown in FIGURES 3a, 6a, 4a, and 8a, respectively. The counterbore cross-sectional areas are several times larger than the corresponding capillary and jet cross-sectional areas.

FIGURE 3a illustrates a conventional round orifice and FIGURE 3b illustrates the conventional, round cross section of a filament spun from this orifice.

FIGURE 4a illustrates a series of three round orifices spaced sufficiently closely that the polymer streams extruded from the orifices coalesce at the spinneret face. The holes are arranged in a straight line to afford a variegated ribbon-like cross-sectional pattern in the coalesced extruded filament, as shown in FIGURE 4b. For patterns of orifices designed for spinning by coalescence, the shape factor is obtained by dividing the square of the sum of the perimeters of the orifices by the sum of the areas of the orifices. The shape factor of the orifice pattern of FIGURE 4a is thus 12 pi.

FIGURE 5a illustrates an orifice having the shape of a maltese cross. The cross section of the filament spun from the orifice is shown in FIGURE 5b.

FIGURE 6a illustrates an orifice of cruciform cross section, formed by the intersection of two punched slots. The cross section of the fiber spun from the orifice is shown in FIGURE 6b.

FIGURE 7a illustrates an orifice having the shape of a three-bladed propeller. The cross section of the filament spun from the orifice is shown in FIGURE 7b.

FIGURE 8a illustrates a series of five punched holes of diamond-shaped cross section spaced sufficiently closely that the polymer streams extruded from the orifices coalesce at the spinneret face. The holes are arranged in an arc to provide a variegated ribbon-like cross section in the coalesced extruded filament, as shown in FIGURE 8b.

Figure 9B:
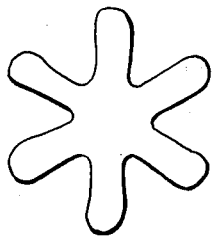

FIGURE 9a illustrates an orifice having the shape of a six-legged star. The cross section of a filament spun from the orifice is shown in FIGURE 9b.

Figure 10A:
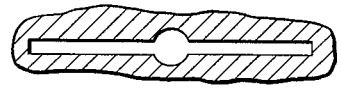
Figure 10B:

FIGURE 10a shows an orifice in the form of a two-bladed propeller. FIGURE 10b illustrates the cross section of a filament spun from the orifice.

Figure 11A:
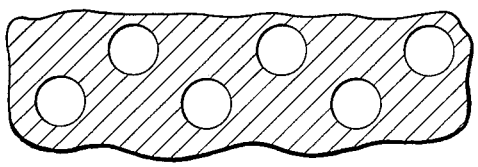
Figure 11B:

FIGURE 11a illustrates an orifice having six round holes spaced in zigzag relationship which provides the filament of zigzag cross section shown in FIGURE 11b.

Figure 12A:
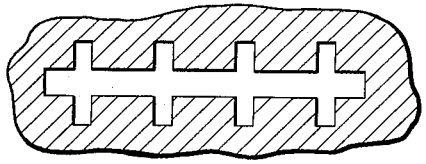
Figure 12B:

FIGURE 12a illustrates a four crosstie, ribbon-type orifice which provides a filament having a cross section of the type shown in FIGURE 12b.

Figure 13A:
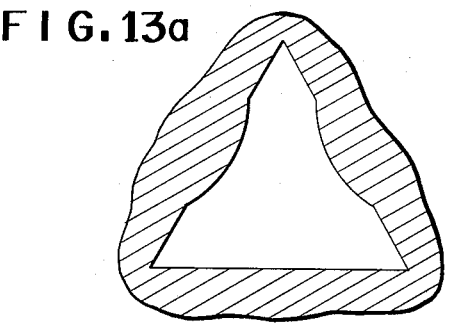
Figure 13B:
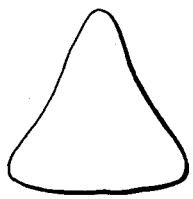

FIGURE 13a illustrates a triangular orifice, with two sides slightly scalloped. The cross section of the filament spun from the orifice is shown in FIGURE 13b.

Figure 14A:
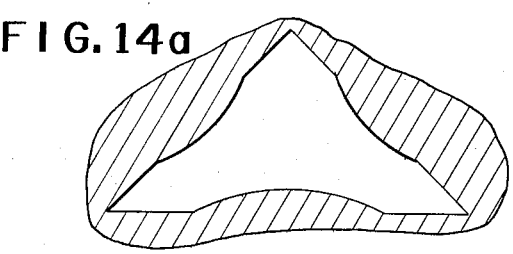
Figure 14B:
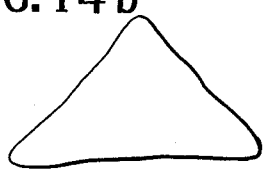

FIGURE 14a shows another essentially three-sided orifice, in which each side has been slightly scalloped. FIGURE 14b illustrates the cross section of a filament spun from the orifice.

Figure 15A:
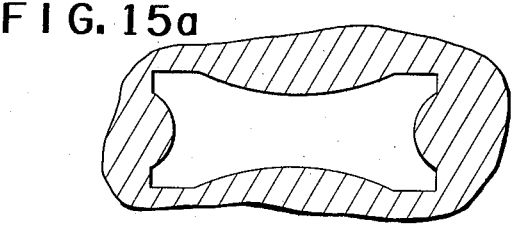
Figure 15B:
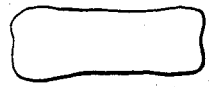

FIGURE 15a illustrates a rectangular orifice, with each side somewhat scalloped, while the filament spun from the orifice is shown in FIGURE 15b.

Figure 16A:
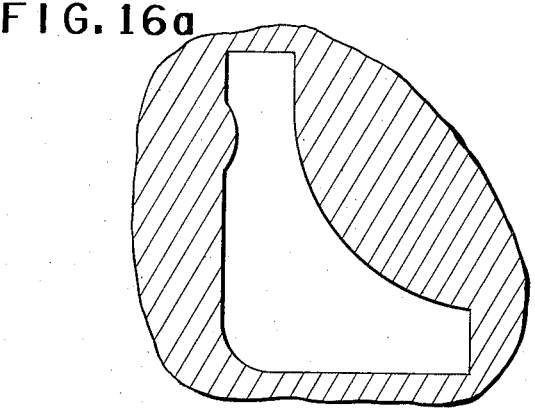
Figure 16B:
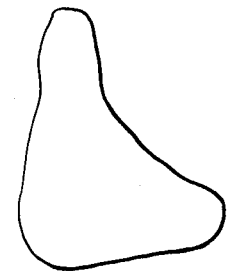

FIGURE 16a illustrates a five-sided orifice, generally L-shaped in form with the inside of the "L" formed by an arc and with a slight scallop on the outer portion of the long side of the L. FIGURE 16b shows the cross section of the filament spun from the orifice.

Figure 17A:
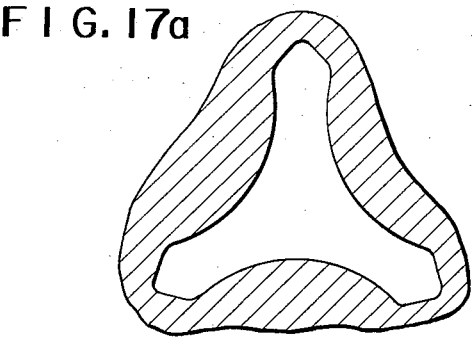
Figure 17B:
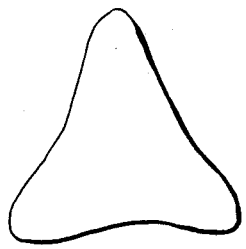

FIGURE 17a illustrates a Y-shaped orifice with sides formed by three concave curves and tips by three convex curves. The orifice is somewhat similar to the three-bladed propeller of FIGURE 7a, but has short, stubby arms. The cross section of the filament spun from the orifice is shown in FIGURE 17b.

In general, the variations in dye receptivity of filaments of different cross section is observed most significantly when the filaments are composed of a linear condensation polyester. Preferably, in accordance with the invention, a linear terephthalate polyester is employed. By "linear terephthalate polyester" is meant a linear polyester in which at least about 75% of the recurring structural units are units of the formula

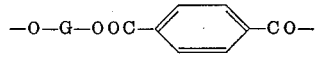

wherein G represents a divalent organic radical containing from 2 to 12 carbon atoms and is attached to the adjacent oxygen atoms by saturated carbon atoms. Thus, the radical —G— may be of the form —$CH_2A_mCH_2$—, where $m$ is 0 or 1 and A represents an alkylene radical, a cycloalkylene radical, a bis-alkylene ether radical, or other suitable organic radical. The linear terephthalate polyesters may be prepared by reacting terephthalic acid or an ester-forming derivative thereof with a glycol, $G(OH)_2$, where —G— is a radical as defined above, to form the bis-glycol ester of terephthalic acid, followed by polycondensation at elevated temperature and reduced pressure with elimination of excess glycol. Examples of suitable glycols include ethylene glycol, diethylene glycol, butylene glycol, decamethylene glycol, and cis- or trans-bis-1,4-(hydroxymethyl) cyclohexane. Mixtures of such glycols may suitably be used to form copolyesters, or small amounts, e.g., up to about 15 mol percent, of a higher glycol may be used, such as a polyethylene glycol. Similarly, copolyesters may be formed by replacing up to about 25 mol percent of the terephthalic acid or derivative thereof with another dicarboxylic acid or ester-forming derivative thereof, such as adipic acid, dimethyl sebacate, isophthalic acid, or sodium 3,5-dicarbomethoxybenzene sulfonate.

Surprisingly, the novel yarns of the invention not only have a more uniform appearance than conventional yarns of the homogeneous cross section but in fabric form they are also somewhat more bulky and have a more pleasing "hand." This results in part from a differential response to heat treatment exhibited by linear terephthalate polyester filaments of various cross sections, in which the changes in length of the various filaments when heated differ by amounts ranging up to several percent. After the filaments are heated, the longer filaments are disposed outwardly from the shorter filaments in the form of loops protruding from the axis of the yarn bundle. The greater bulk of the yarn bundle also results in part from the fact that filaments of different cross section generally do not pack together in the yarn bundle as closely as filaments of homogeneous cross section.

The following examples will serve to further illustrate the invention and are not intended to be construed as limitative.

*Example I*

A 5-inch stainless steel spinneret plate is prepared containing orifices of ten different shapes. Each of the orifices is provided with a 1/16 inch diameter counterbore section. The spinneret contains a total of 34 orifices, seven round orifices and three of each of the orifices having the configurations illustrated in FIGURES 4a through 12a.

Polyethylene terephthalate having an intrinsic viscosity of 0.53 and containing 0.3% $TiO_2$ is spun at 296° C. from the orifices described above, using a metering plate having 9-mil capillary sections above the spinneret plate. The filaments extruded from the spinneret are collected as a single filament bundle. The filament bundle is wound up at a speed of 1200 yards per minute and it is found to have an as-spun denier of 240. The spun yarn is oriented by passing it from a feed roll maintained at 96° C. and operating at a peripheral speed of 150 yards per minute, thence to an unheated draw roll operated at a peripheral speed of 454 yards per minute, after which the yarns are wound on a conventional windup. The drawn yarns are found to have a denier of 96.8, a tenacity of 2.5 grams per denier, and an elongation of 30.3%.

The drawn yarns are woven into a taffeta fabric containing 90 ends per inch in the warp and 76 ends per inch in the filling. The fabric is dyed for four hours at 100° C. in a dye bath comprising 2% of 1,4-diamino-2,3-dichloroanthraquinone, based on the weight of the fabric. A control fabric is prepared as just described except round filaments are utilized in lieu of the filaments of different cross-sectional shapes. The dyed fabric is observed to be more uniform in appearance than the control fabric prepared from the conventional, round cross section polyethylene terephthalate yarn. The fabric prepared from the yarn containing filaments of different cross section is also observed to be somewhat more attractive in appearance and to have a somewhat softer hand than the control fabric.

*Example II*

A 3-inch stainless steel spinneret is fabricated containing forty-four 1/16 inch diameter counterbores. From 22 of the counterbores 15-mil diameter round holes are drilled, while from the other 22 counterbores cruciform orifices are prepared by punching two intersecting 4 x 34 mil slots from each counterbore section. The shape factors of the round and cruciform orifices are accordingly 12.6 and 72. Polyethylene terephthalate having an intrinsic viscosity of 0.53 and containing 0.2% $TiO_2$ is spun at 295° C. from the spinneret, the filaments being wound up together as a single bundle at 1200 yards per minute. The yarn is oriented as described in the preceding example. The drawn yarn is found to have a denier of 61.0, a tenacity of 4.3 grams per denier, an elongation of 13.6%, and an initial modulus of 114 grams per denier. Individual round and cruciform filaments are teased out from the filament bundle and it is found that the round filaments have an average vibrational denier of 1.59 and an average shrinkage in 100° C. water of 9.8%, while the cruciform filaments are found to have an average vibrational denier of 1.55 and an average shrinkage of 9.12%.

The yarn is woven into a taffeta fabric containing 90 ends per inch in warp and 76 ends per inch in the filling. The fabric is dyed for four hours at 100° C. in a dye bath comprising 2% (based on the fabric weight) of a dye having the formula

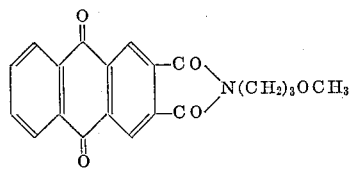

The dyed fabric is observed to be more uniform in appearance than a control fabric prepared from conventional, round cross section polyethylene terephthalate yarn prepared under the same conditions.

*Example III*

Two spinnerets are prepared, each having a diameter of two inches and containing 25 orifices, five each of five different orifice shapes as shown in FIGURES 13a to 17a. The diameters of the smallest circles capable of circumscribing these orifices are 21, 26, 20, 27 and 21 mils, respectively. The shape factors of the orifices are calculated as 24, 35, 33, 26 and 33, respectively. The two spinneret plates, each surmounted by a metering plate, are inserted in adjacent spinneret packs fed by the same molten polymer. Each metering plate contains 25 round orifices, five each of five different capillary diameters: 9, 10, 10.5, 11, and 12 mils, respectively. The arranegment of orifices in the metering and spinneret plates is such that each size of metering plate orifice delivers polymer to one orifice of each different shape. Thus, each filament differs from all the others spun from the same spinneret plate in either denier or cross section.

A copolyester of ethylene glycol and a mixture of 98 mol percent dimethyl terephthalate, 1.5 mol percent potassium, 3,5-di(carbomethoxy)benzenesulfate, and 0.5 mol percent sodium 3,5-di(carbomethoxy)benzenesulfonate is prepared in accordance with the general method described by Griffing and Remington in their U.S. Patent 3,018,272. Its intrinsic viscosity is 0.5. The copolyester is melt spun from the two adjacent spinnerets described above into stationary room temperature air and the extruded filaments from each spinneret are gathered separately as 25-filament bundles. The bundles are taken up separately on the same feed roll operating at a pehipheral speed of 935 y.p.m., passed separately under the same draw pin immersed in a bath of water maintained at 90° C., passed out of the bath via a pair of guides to separate pairs of draw rolls operating at peripheral speeds of 2750 y.p.m., and passed through an interlacer to intermingle the filaments of the two bundles and combine them into a unitary yarn, which is then wound on a conventional windup. The pair of draw rolls over which one filament bundle is passed is heated at 170° C., while the draw roll over which the other filament bundle is passed is heated at 103° C. The yarn so obtained has a denier of 70, a tenacity of 2.5 g.p.d., an elongation of 26%, and an initial modulus of 82 g.p.d.

When a sample of the yarn is imersed in boiling water for 5 minutes, it shrinks about 13% and becomes bulky, various filaments exhibiting a shrinkage differential of 5%. A photomicrograph of the yarn in cross section shows filament cross sections as depicted in FIGURES 13b to 17b, inclusive. The shape factors of the drawn filament cross sections as estimated from the photomicrograph are approximately 14, 18, 14, 16, and 15, respectively.

The yarn is woven into a taffeta fabric containing 118 ends per inch in the warp and 87 ends per inch in the filling. The fabric has a weight of 2.11 ounces per square yard, a thickness of 4.41 mils, and its bulk is 1.57 cc./gm., the latter two measurements being made under a load of 239 g./cm.$^2$. The fabric has a subtle, silklike luster and a pleasing silklike hand. The fabric is dyed at 100° C. in a dye bath containing 0.5% of 1-amino-2-bromo-4-hydroxy-anthraquinone, based on the weight of the fabric. The dyed fabric, which is bluish red in color, has an attractive, highly uniform appearance. Another piece of the fabric is dyed at 100° C. with 0.5% of the brown azo dye obtained by coupling the diazo compound from 2,6-dichloro-4-nitroaniline to N-ethyl-N-(2-cyanoethyl)-m-toluidine. The fabric is dyed to an attractive brown color and presents a highly uniform appearance.

*Example IV*

A copolyester of ethylene glycol and a mixture of 98 mol percent dimethyl terephthalate, 1.5 mol percent potassium 3,5-di(carbomethoxy)benzenesulfonate and 0.5 mol percent sodium 3,5-di(carbomethoxy)benzenesulfonate is prepared and melt spun through a 3-inch spinneret containing 100 orifices, divided into two groups of 50 orifices each. Each group of 50 orifices comprises ten each of five different orifice shapes as shown in FIGURES 13a to 17a. The intrinsic viscosity of the polymer is 0.5, and no metering plate is used. Quenching is accomplished by passing air through a screen and into contact with the filaments, about 0.5 cubic foot of air being used per minute per square inch of screen. Each group of 50 filaments is gathered together as a filament bundle and wound up separately at 1200 y.p.m. The bundles so obtained are processed subsequently as separate yarns, each being passed from a pair of feed rolls between which is situated a curved heating block maintained at 115° C., around a draw pin, around a draw roll rotated at a peripheral speed of 454 y.p.m., and thence to a conventional wind-up. The draw ratio is 2.85. The drawn yarn has a denier of 71.3, a tenacity of 2.9 g.p.d., an elongation of 16%, and a modulus of 86 g.p.d. The yarn is woven into a taffeta fabric containing 114 ends per inch in a warp and 89 ends per inch in the filling. The fabric has a weight of 2.08 ounces per square yard, a thickness of 4.43 mils, and its bulk is 1.57 cc./g., the latter two measurements being made under a load of 239 g./cm.$^2$. The fabric has a uniform, lustrous appearance and a rather silk-like hand. When dyed with the dyes employed in Example III, it exhibits a highly uniform appearance.

The example is repeated, employing a metering plate containing 100 round orifices, twenty each of five different capillary diameters: 9, 10, 10.5, 11, and 12 mils. The arrangement of orifices in the metering and spinneret plates is such that each bundle of 50 filaments comprises 25 pairs of filaments, the filaments in each pair differing from all the other filaments in either denier or cross section. The 50-filament bundles are wound separately and then drawn. The yarn so obtained has a denier of 72.7, a tenacity of 2.5 g.p.d., an elongation of 12%, and a modulus of 82 g.p.d. The yarn is woven into a taffeta fabric containing 117 ends per inch in the warp and 85 ends per inch in the filling. The fabric has a weight of 2.14 ounces per square yard, a thickness of 4.45 mils, and its bulk is 1.55 cc./g., the latter two measurements being made under a load of 239 g./cm.$^2$. Both the luster and hand of the fabric are very silklike and appealing. When dyed with the dyes employed in Example III, it presents a highly uniform appearance.

The novel yarns of this invention may be advantageously used in a variety of fabric constructions. They may be dyed either prior to or after being knitted or woven into a fabric. They may be dyed using known dyes for polyester yarns.

As many widely different embodiments of this invention may be made without departing from the spirit and scope thereof, it is to understood that this invention is not to be limited to the specific embodiments thereof except as defined in the appended claims.

I claim:
1. A process for the formation of a composite continuous multifilament yarn having a uniform appearance in a dyed fabric which comprises shaping a molten linear polyester by extruding the polyester through a spinneret to form a plurality of continuous filaments, said spinneret containing a plurality of orifices having at least two different shapes, at least about 25% of the orifices having a shape factor of at least about 18 and not more than about 75% of the orifices having the same shape, with the proviso that when all the orifices have the same number of sides there is a ratio of at least about 1.4 between the shape factors of the orifices having the highest and lowest shape factors, quenching the molten filaments to solidify them in essentially the same cross-section as the shape of the orifices from which they are extruded, gathering the filaments together in the form of a yarn and orienting them, and winding the resulting yarn.

2. The process of claim 1 wherein said polyester is polyethylene terephthalate.

3. The process of claim 1 wherein at least three species of filaments are present in said yarn.

4. The process of claim 1 in which the filaments are drawn to about two to five times their original length.

5. The process of claim 1 in which the major portion of the filaments produced are round.

References Cited by the Examiner

UNITED STATES PATENTS

| | | |
|---|---|---|
| 1,902,953 | 3/1933 | Hazell. |
| 2,637,893 | 3/1953 | Shaw _____ 161—177 |
| 2,750,653 | 6/1956 | White. |
| 2,945,739 | 7/1960 | Lehmicke. |
| 2,959,839 | 11/1960 | Craig. |
| 2,980,492 | 4/1961 | Jamieson et al. _____ 264—290 |
| 3,095,607 | 7/1963 | Cobb. |
| 3,156,085 | 11/1964 | Jamieson. |

FOREIGN PATENTS

| | | |
|---|---|---|
| 401,160 | 1/1933 | Great Britain. |
| 710,087 | 6/1954 | Great Britain. |
| 1,169,006 | 9/1958 | France. |
| 1,265,227 | 5/1961 | France. |

ALEXANDER H. BRODMERKEL, *Primary Examiner.*

ROBERT F. WHITE, *Examiner.*

K. W. VERNON, A. L. LEAVITT, *Assistant Examiners.*